(12) United States Patent
Gano et al.

(10) Patent No.: US 9,534,701 B2
(45) Date of Patent: Jan. 3, 2017

(54) OPENING OR CLOSING A FLUID FLOW PATH USING A MATERIAL THAT EXPANDS OR CONTRACTS VIA A CHANGE IN TEMPERATURE

(71) Applicant: HALLIBURTON ENERGY SERVICES, INC., Houston, TX (US)

(72) Inventors: John C. Gano, Carrollton, TX (US); Michael L. Fripp, Carrollton, TX (US); Caleb T. Warren, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 408 days.

(21) Appl. No.: 13/731,975

(22) Filed: Dec. 31, 2012

(65) Prior Publication Data

US 2013/0192833 A1 Aug. 1, 2013

Related U.S. Application Data

(63) Continuation of application No. PCT/US2012/023439, filed on Feb. 1, 2012.

(51) Int. Cl.
- *E21B 23/04* (2006.01)
- *E21B 43/12* (2006.01)
- *F16K 31/00* (2006.01)
- *E21B 34/06* (2006.01)
- *E21B 36/00* (2006.01)

(52) U.S. Cl.
CPC ............ *F16K 31/002* (2013.01); *E21B 34/06* (2013.01); *E21B 36/00* (2013.01); *Y10T 137/0324* (2015.04); *Y10T 137/7737* (2015.04)

(58) Field of Classification Search
CPC ......... E21B 23/04; E21B 43/12; F16K 31/002
See application file for complete search history.

(56) References Cited

U.S. PATENT DOCUMENTS

| | | | |
|---|---|---|---|
| 3,120,267 A * | 2/1964 | Bayless | E21B 34/06 166/332.1 |
| 7,971,651 B2 | 7/2011 | Tanju et al. | |
| 2007/0144731 A1 | 6/2007 | Murray et al. | |
| 2008/0149323 A1 | 6/2008 | O'Malley et al. | |
| 2009/0151957 A1* | 6/2009 | Sickle et al. | 166/373 |
| 2009/0218089 A1* | 9/2009 | Steele et al. | 166/53 |
| 2009/0314497 A1* | 12/2009 | Johnson | 166/381 |
| 2010/0078173 A1* | 4/2010 | Buytaert et al. | 166/302 |
| 2011/0284229 A1* | 11/2011 | Radmanovich | E21B 43/261 166/308.1 |
| 2012/0025113 A1* | 2/2012 | Stadelbauer et al. | 251/11 |
| 2012/0247780 A1* | 10/2012 | Gilbertson et al. | 166/330 |

FOREIGN PATENT DOCUMENTS

WO WO2011048368 A2 4/2011

* cited by examiner

Primary Examiner — Kipp Wallace
(74) Attorney, Agent, or Firm — McGuireWoods LLP (57) ABSTRACT

A device for opening or closing a fluid flow path comprises: a fluid inlet, wherein the fluid inlet comprises one end of the fluid flow path; an inlet covering, wherein the inlet covering is adjacent to the fluid inlet; and a material, wherein the material is capable of expanding or contracting via a change in temperature; wherein the expansion or contraction of the material causes movement to the inlet covering, and wherein the movement of the inlet covering either opens or closes the fluid flow path. A method for opening or closing a fluid flow path using the device comprises: allowing or causing a change in temperature to the material.

15 Claims, 8 Drawing Sheets

OPENING OR CLOSING A FLUID FLOW PATH USING A MATERIAL THAT EXPANDS OR CONTRACTS VIA A CHANGE IN TEMPERATURE

CROSS-REFERENCE TO RELATED APPLICATION

This application claims priority to PCT Application No. PCT/US12/23439, filed on Feb. 1, 2012.

TECHNICAL FIELD

A device for opening or closing a fluid flow path using a material that is capable of expanding or contracting via a change in temperature is provided. The fluid flow path can be opened or closed via movement of an inlet covering. The inlet covering can be moved by the expansion or contraction of the material. Methods of using the device are also provided. The device can be used in a well system.

SUMMARY

According to an embodiment, a device for opening or closing a fluid flow path comprises: a fluid inlet, wherein the fluid inlet comprises one end of the fluid flow path; an inlet covering, wherein the inlet covering is adjacent to the fluid inlet; and a material, wherein the material is capable of expanding or contracting via a change in temperature; wherein the expansion or contraction of the material causes movement to the inlet covering, and wherein the movement of the inlet covering either opens or closes the fluid flow path.

According to another embodiment, a method for opening or closing a fluid flow path comprises: allowing or causing a change in temperature to a material, a) wherein the material expands or contracts via the change in temperature, b) wherein the expansion or contraction of the material causes movement to an inlet covering, wherein the inlet covering is adjacent to a fluid inlet and wherein the fluid inlet comprises one end of a fluid flow path, and c) wherein the movement of the inlet covering either opens or closes the fluid flow path.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more fluid flow paths, outlets, etc., as the case may be, and does not indicate any particular orientation or sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas, or water production well, or an injection well. Fluid is often injected into a production well as part of the construction process or as part of the stimulation process. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Inflow control devices (ICDs), including autonomous inflow control devices, are commonly used to variably restrict the flow rate of a fluid. One example of when these devices are used is for controlling the pressure between different zones of a subterranean formation. For example, one zone of the formation can have a higher permeability compared to another zone. Permeability refers to how easily fluids can flow through a material. The pressure within each zone can vary due to a variety of factors, including the permeability of the subterranean formation associated with that zone. As such, ICDs can be placed in the zones in order to regulate the flow rate in each zone to adjust for over- or under-pressurization.

Another example of when ICDs are used is when an undesired fluid is produced along with a desired fluid. Undesired fluid production can be common in horizontal wellbores. A horizontal wellbore can include a heel, which is the portion of the wellbore where the vertical portion of the wellbore and the horizontal portion of the wellbore joins. The horizontal wellbore can also include a toe, which is the end portion of the horizontal wellbore that is farthest away from the wellhead. Generally, the flowing pressure at the heel of a horizontal wellbore is lower than at the toe due to pressure losses along the wellbore. This lower pressure at the heel allows undesired fluids, such as water or gas, to be drawn to the heel region (known as water coning and gas coning). Water coning and gas coning can cause a premature end to the life of a well. Therefore, ICDs can be used along the length of a wellbore to help provide a more constant pressure to the wellbore and reduce or eliminate water or gas coning.

Another example of when ICDs are used is for enhanced recovery operations. An injection well can be used during enhanced recovery operations to conduct water flooding techniques. Water flooding is where water is injected into the reservoir to displace oil or gas that was not produced during primary recovery operations. The water from the injection well physically sweeps some of the remaining oil or gas in the reservoir towards a production well. The enhanced recovery operations may also inject steam, carbon dioxide, acids, or other fluids. However, potential problems associated with enhanced recovery techniques can include inefficient recovery due to variable permeability in a subterranean formation and a difference in flow rates of a fluid from the injection well into the subterranean formation. Therefore, ICDs can be used to provide a more uniform pressure and flow rate of fluid into the formation.

It may be desirable to disable one or more ICDs from functioning as an inflow control device. For example, at the end of the life of a well, it may be desirable to disable an ICD. During the end of the life of a well, there may still be residual oil or gas that can be produced. However, a functional ICD can limit the amount of oil or gas that can be produced. Therefore, by disabling the ICD, fluids (including the oil or gas) are not inhibited from being produced.

Other examples of when it may be desirable to disable an ICD include stimulation techniques, initial wellbore clean-up, and loss of pressure in one or more zones. An ICD can control the flow rate of a fluid both, into and out of a wellbore. During stimulation techniques, fluids can be injected into a portion of the subterranean formation to help increase the permeability of the formation. Common stimulation operations include acidizing and fracturing. During these operations, it may be undesirable to restrict the flow rate of the fluid entering the formation. Initial wellbore clean-up is used to remove ingredients from the wellbore, such as filtercake and drilling mud, which if left in the wellbore could impede production of oil or gas. It may be desirable to disable an ICD during wellbore clean-up so that the flow of the clean-up fluids is not restricted. If pressure is lost in one or more zones, disabling the ICD in that zone may help create a more uniform pressure across all zones.

Disabling an ICD is generally accomplished via engagement with a sliding sleeve. The sleeve can be designed to cover a fluid inlet, or port. In the open position, the sleeve allows fluids to flow into the ICD. If it is desirable to disable the ICD, then a mechanical tool can be inserted into the wellbore at the location of the ICD. The tool can engage the sleeve and the sleeve can be moved via the tool. The sleeve can be moved to close the port into the ICD. The tool can also be used to open a port into an alternate (or bypass) fluid flow path by opening the previously-closed port by sliding the sleeve. However, some disadvantages to using sliding sleeves include: when multiple ICDs are used, it can be quite expensive to include a sliding sleeve on every ICD; additional tools must be purchased to engage with the sleeve to cause movement; and it can often be difficult to accurately engage the tool with the sleeve to cause movement of the sleeve. Therefore, there exists a need for being able to open or close a fluid flow path in a more economical manner without inserting a tool into the wellbore.

A novel device uses expansion or contraction of a material via a change in temperature to open or close a fluid flow path. The expansion or contraction can move an inlet covering to open or close the path. According to an embodiment, a tool does not need to be engaged with the inlet covering to cause movement of the covering. This novel device provides a less expensive alternative to the use of sliding sleeves.

The device can be, but does not need to be, used in oil or gas operations, such as subterranean wells, carbon sequestration, and geothermal wells. The device can be useful in applications where an inflow control device (ICD) is used, and can be used to enable or disable the ICD. Other applications where the device may be used include, but are not limited to, pipelines, chemical plants, oil refineries, and food processing plants.

According to an embodiment, a device for opening or closing a fluid flow path comprises: a fluid inlet, wherein the fluid inlet comprises one end of the fluid flow path; an inlet covering, wherein the inlet covering is adjacent to the fluid inlet; and a material, wherein the material is capable of expanding or contracting via a change in temperature; wherein the expansion or contraction of the material causes movement to the inlet covering, and wherein the movement of the inlet covering either opens or closes the fluid flow path.

According to another embodiment, a method for opening or closing a fluid flow path comprises: allowing or causing a change in temperature to a material, a) wherein the material expands or contracts via the change in temperature, b) wherein the expansion or contraction of the material causes movement to an inlet covering, wherein the inlet covering is adjacent to a fluid inlet and wherein the fluid inlet comprises one end of a fluid flow path, and c) wherein the movement of the inlet covering either opens or closes the fluid flow path.

Any discussion of the embodiments regarding the device or any component of the device is intended to apply to both, the apparatus embodiments and the method embodiments. Any discussion of a particular component of an embodiment (e.g., a seat) is meant to include the singular form of the component and also the plural form of the component, without the need to continually refer to the component in both the singular and plural form throughout. For example, if a discussion involves "the seat," it is to be understood that the discussion pertains to one seat (singular) and two or more seats (plural).

The device includes a fluid inlet 41, wherein the fluid inlet 41 comprises one end of a fluid flow path. Any of the fluid flow paths can be a variety of shapes including, tubular, rectangular, pyramidal, or curlicue in shape. There can also be more than one fluid flow path, for example, a first fluid flow path 31 and a second fluid flow path 32. There can also be more than two fluid flow paths. The paths can be operatively connected to one another. The device and any component of the device can be made from a variety of compounds. Examples of suitable compounds include, but are not limited to: metals, such as steel, aluminum, titanium, and nickel; alloys; plastics; composites, such as fiber reinforced phenolic; ceramics, such as tungsten carbide, boron carbide, synthetic diamond, or alumina; elastomers; and dissolvable materials. According to an embodiment, the compound is selected such that it is resistant to corrosion from contact with a fluid. The fluid flow path can include a fluid outlet. An inflow control device (ICD) can be located between the fluid inlet and the fluid outlet. If there is more than one fluid flow path, then the first fluid flow path 31 can comprise a first fluid outlet 33, and the second fluid flow path 32 can comprise a second fluid outlet 34. The outlets can be functionally oriented towards a wellbore 12 or towards a subterranean formation 20, shown in FIGS. 5 and 6.

According to an embodiment, the material 47 is capable of expanding with a change in temperature. Examples of materials capable of expanding with a decrease in temperature include, but are not limited to, liquid forms of: water, silicon, germanium, bismuth, antimony, gallium, and metal alloys containing any of the aforementioned metals; shape-memory metals; and shape-memory plastics. The material can become less dense as the material undergoes a phase change from a liquid to a solid thereby expanding with the decrease in temperature. Examples of materials capable of expanding with an increase in temperature include, but are not limited to, shape-memory alloys, shape-memory plastics, most metals, plastics, compounds undergoing a phase change (e.g., from a solid to a liquid or from a liquid to a gas), and compounds that are malleable near ambient temperatures (71° F.), such as wax.

The material 47 can also be capable of contracting with a change in temperature. Examples of materials capable of contracting with a decrease in temperature include, but are not limited to, shape-memory alloys, shape-memory plastics, most metals, plastics, compounds undergoing a phase change (e.g., from a gas to a liquid or from a liquid to a solid), and compounds that are malleable near ambient temperatures (71° F.), such as wax. Examples of materials capable of contracting with an increase in temperature include, but are not limited to, liquid forms of: water, silicon, germanium, bismuth, antimony, gallium, and metal alloys containing any of the aforementioned metals; shape-memory metals; and shape-memory plastics. The material can become more dense as the material undergoes a phase change from a solid to a liquid thereby contracting with the increase in temperature.

According to an embodiment, the material 47 is selected such that a desired amount of expansion or contraction is achieved. According to another embodiment, the material 47 is selected based on an anticipated temperature. The temperature at which expansion or contraction occurs can be at a temperature above or below the transition temperature of the material 47, respectively. By way of example, a shape-memory alloy can be designed such that it expands (or contracts) when the temperature increases to above the transition temperature of the alloy; therefore, the temperature may be selected such that the temperature is above the transition temperature of the shape-memory alloy. However, by way of another example, wax will become a liquid if the temperature goes above the transition temperature of the wax; therefore, the temperature may be selected such that the temperature is below the transition temperature of the wax. According to an embodiment, a sufficient amount of cold is applied to the material 47 to cause the expansion or contraction of the material. According to another embodiment, a sufficient amount of heat is applied to the material 47 to cause the expansion or contraction of the material. The environment can have an anticipated temperature. The material 47 can be selected based on the anticipated environmental temperature. Of course, it is possible to control the environmental temperature as discussed below. The pressure of the environment can also have an effect on the environmental temperature. As such, the pressure of the environment can be taken into consideration when anticipating or controlling the temperature. According to an embodiment, the material 47 is allowed to expand or contract due to the environmental temperature.

According to another embodiment, the material 47 is a bimetallic strip. A bimetallic strip can be formed from bonding together metals having different thermal expansion properties. The bimetallic strip can cause movement of the inlet covering 43 via the change in temperature.

The device also includes an inlet covering 43, wherein the inlet covering 43 is adjacent to the fluid inlet. The inlet covering can be connected to the fluid inlet, or it can be close to the fluid inlet, but not necessarily touching. The expansion or contraction of the material 47 causes movement to the inlet covering 43. The movement of the inlet covering 43 either opens or closes the fluid flow path. As used herein, the term "open" and all grammatical variations thereof means the amount of fluid entering the fluid flow path increases. It is to be understood that "opening" the path does not require that the inlet into the path be completely unobstructed by a component, for example, the inlet covering 43, but rather, the amount of fluid entering the flow path increases. There can be some fluid flow into the fluid flow path prior to opening the fluid flow path, and after opening, the amount of fluid flowing into the path increases. As used herein, the term "close" and all grammatical variations thereof means the amount of fluid entering the fluid flow path decreases. It is to be understood that "closing" the path does not require that the inlet into the path be completely obstructed by a component, for example, the inlet covering 43, but rather, the amount of fluid entering the flow path decreases. There can be some fluid flow into the fluid flow path after closing the fluid flow path, and there can also be no fluid flow into the flow path after closing.

According to an embodiment, the inlet covering 43 is moved a sufficient distance to open or close the fluid flow path. For example, the inlet covering 43 can be moved a sufficient distance to expose a fluid inlet leading into the fluid flow path in order to open the flow path. By way of another example, the inlet covering 43 can be moved a sufficient distance to cover the fluid inlet leading into the fluid flow path in order to close the flow path.

Figure 1A:
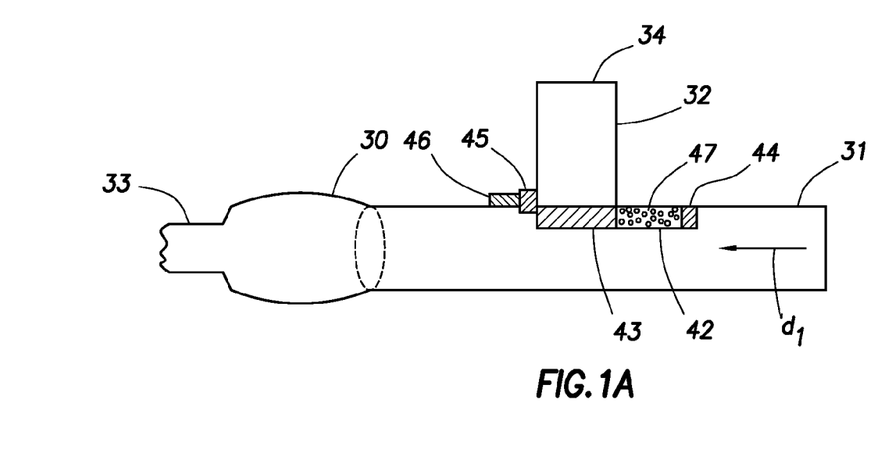
FIGS. 1A and 1B depict a device for opening or closing a fluid flow path according to an embodiment using an expandable material.
Figure 1B:
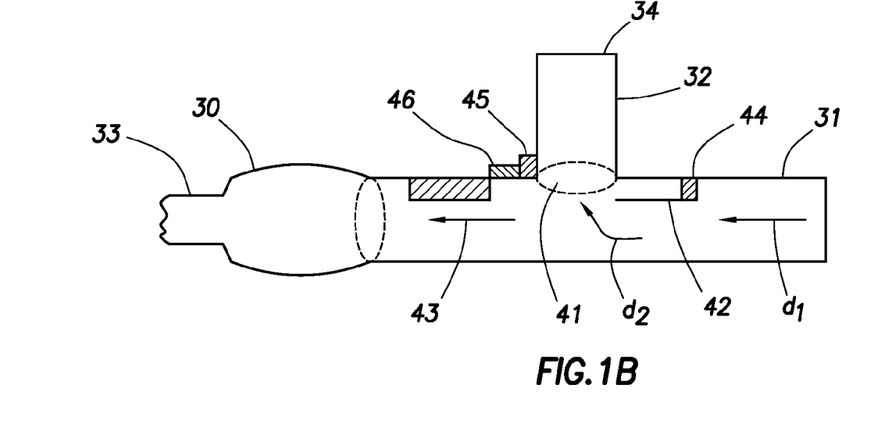

Referring to FIGS. 1A and 1B, the inlet covering 43 can include, but is not limited to a plug, plate, or sleeve. The device can further include a chamber 42. According to an embodiment, the chamber 42 is capable of holding the material 47. The chamber 42 can be a variety of shapes. According to an embodiment, the shape of the chamber 42 is selected such that it is capable of holding the material 47. The inlet covering 43 can be adjacent to the chamber 42. According to another embodiment, the shape of the chamber 42 is selected such that the expansion or contraction of the material 47 causes movement to the inlet covering 43.

According to an embodiment, the chamber 42 comprises solid walls. As can be seen in FIGS. 1A and 1B, the device can further comprise an expansion restrictor 44, wherein the expansion restrictor 44 is positioned adjacent to one of the walls of the chamber 42. The expansion restrictor 44 can help control the direction of expansion of the material 47 and can direct the expansion of the material 47 in a desired direction. By way of example, the expansion restrictor 44 can be a plate. According to an embodiment, at least one of the walls of the chamber 42 is capable of separating from the other walls of the chamber. The wall that is capable of separating can be located opposite from the expansion restrictor 44. In this manner, as the material 47 expands, the expansion restrictor 44 can direct the direction of expansion of the material towards the wall that is capable of separating. According to an embodiment, the at least one of the walls becomes separated via expansion of the material 47. For example, if the material 47 expands a sufficient amount, then the at least one of the walls of the chamber 42 can separate from the remaining walls. Furthermore, as the material 47 expands, the material can cause movement of the inlet covering 43.

According to another embodiment, the chamber 42 can comprise a porous substance. By way of example, the porous substance can be a ceramic. According to this embodiment, the material 47 can be located within the pores of the porous substance. Upon expansion of the material 47, the porous substance can break. For example, if water is located within the pores of the porous substance, then upon freezing, the water can expand, thus breaking the porous substance. The breaking of the porous substance can be used to open the fluid flow path. For example, the force of the breaking of the porous substance can cause movement to the inlet covering 43. By way of another example, a chamber 42 comprising the porous substance can maintain the inlet covering 43 in an open or closed position. Then, after the porous substance breaks, the inlet covering 43 is no longer maintained in the open or closed position and the inlet covering 43 can move into the opposite position. According to this example, the inlet covering 43 can further include an energy storage device, such as a spring, that can help move the inlet covering 43 into the new position.

The device can further include a shear pin 45. The shear pin 45 can be located adjacent to the inlet covering 43 in the direction of movement of the inlet covering 43, for example, on the opposite side of the inlet covering 43 from the expansion restrictor 44. The shear pin 45 can help inhibit or prevent premature movement of the inlet covering 43. The shear pin 45 can be designed such that when a pre-determined amount of force is applied to the shear pin 45, the pin breaks. The device can be designed such that after the shear pin 45 breaks, the inlet covering 43 is capable of moving into an open or closed position.

The device can further including a retainer 46. The retainer 46 can be positioned adjacent to the shear pin 45. The retainer 46 can also be positioned adjacent to the inlet covering 43 after movement of the inlet covering 43 has occurred. The retainer 46 can prevent reverse movement of the inlet covering 43 after the covering has moved. Examples of suitable retainers 46 include, but are not limited to, a collet, a clamp, a J-slot, and a detent. The retainer 46 can permanently or reversibly prevent reverse movement of the inlet covering 43. Retainers are common knowledge, and one of skill in the art can select the appropriate retainer for the desired function (e.g., permanent or reversible). One can also include additional components not mentioned in order to make a specific retainer function as a permanent or reversible retainer. Depending on the design of the device, movement of the inlet covering 43 may always be permanent. For example, and as can be seen in FIGS. 1A and 1B, one or more phase changes of the material can prevent the material from being contained. In FIG. 1A, a material such as liquid water can be contained in the chamber 42. A phase change of the water from a liquid to a solid can cause separation of a wall of the chamber 42 and movement of the inlet covering 43. If the water undergoes another phase change from a solid back to a liquid, then the water will no longer be contained in the chamber 42 due to separation of the wall. As such, the liquid water can flow into the first fluid flow path 31 or the second fluid flow path 32 and movement of the inlet covering 43 will be permanent.

Turning to FIGS. 2A-3B, the inlet covering 43 can also be part of a valve. The valve can be any valve that is capable of opening or closing the fluid flow path. The valve can be, without limitation, a poppet valve, a check valve, a relief valve, a sleeve valve, a plug valve, a ball valve, a gate valve, or a shuttle valve.

The device can further include a piston 48, wherein the valve can be connected to the piston 48. The piston 48 can be adjacent to the chamber 42. In this manner, expansion of the material 47 causes movement of the valve via the piston 48. The piston 48 can also help contain the material 47 within the chamber 42.

The device can further include one or more seats for the valve. There can be an upper seat 51 and a lower seat 52 for the valve. The seat can be oriented such that the valve head engages with the seat and once seated, fluid flow around the seat/valve engagement area is inhibited or prevented.

The device can further include an energy storage device 49. Examples of an energy storage device 49 include, without limitation, strain energy in tension/compression, shear stored in solids, or compression stored in liquids or gases, for example springs (including mechanical springs, liquid springs, and fluid springs, e.g., nitrogen springs). The energy storage device can also be part of the environment. For example, in some wellbores, energy is stored in a pressure differential between an air chamber and the hydrostatic pressure in the wellbore. The energy storage device 49 can be part of the valve, for example, part of the valve stem. The energy storage device can be used to help prevent one or more parts of the valve from breaking during engagement with the seat or another component of the device. For example, the energy storage device 49 can control the maximum pressure exerted on the head of the valve from the expansion of the material 47 during engagement and prevent a failure of the valve.

There can be more than one device used in a system. For example, a first device can be positioned adjacent to the first fluid flow path 31 and a second device can be positioned adjacent to the second fluid flow path 32. The devices can be the same or different. For example, the first device can include an inlet covering 43 as depicted in FIGS. 1A and 1B while the second device can include an inlet covering 43 as depicted in FIGS. 2A-4B. By way of another example, the first device can include a material 47 that expands to open the first fluid flow path 31 and the second device can include a material 47 the contracts to open the second fluid flow path 32. Moreover, the first device can be designed such that the expansion or contraction of the material 47 opens the first fluid flow path 31 and the second device can be designed such that the expansion or contraction of the material 47 closes the second fluid flow path 32 (or vice versa).

The first fluid flow path 31 can be interconnected to an inflow control device (ICD) 30. The ICD 30 can be an autonomous ICD. Autonomous ICDs are generally considered to be an independent device, i.e., are designed to automatically control the flow of a fluid without any external intervention.

The following are examples of designs of the device and uses thereof. The following are not the only examples that could be given and are not intended to limit the scope of the invention.

As depicted in FIGS. 1A and 1B, the device can be positioned adjacent to the second fluid flow path 32. Fluid can flow into the first fluid flow path 31 in the direction of $d_1$. As shown in FIG. 1A, the device is in a closed position. In the event it is desirable to decrease the amount of fluid flowing into the ICD 30, the material 47 can expand via a change in temperature to cause movement of the inlet covering 43. This movement opens the fluid inlet 41, thereby allowing at least some of the fluid to enter the second fluid flow path 32 in the direction of $d_2$. Although not shown, the system can further include another device that upon closing can restrict or prevent fluid from flowing past the fluid inlet 41 and entering the ICD 30. As can also be seen in FIGS. 1A and 1B, the system can be designed such that movement of the inlet covering 43 is permanent. For example, the system can include the retainer 46, wherein the retainer 46 prevents the inlet covering 43 from moving back into a closed position after the movement of the inlet covering 43 into the open position.

Figure 2A:
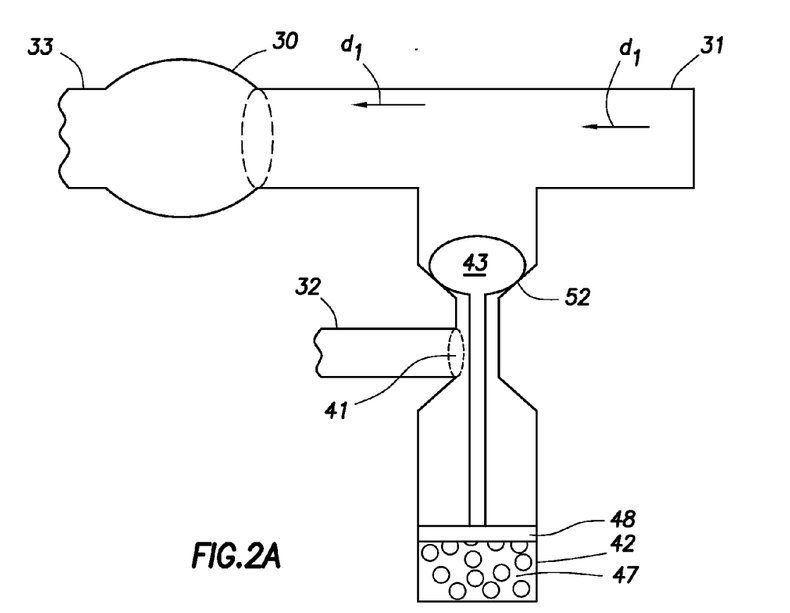
FIGS. 2A and 2B depict the device comprising a valve according to another embodiment wherein the expansion of the material opens the fluid flow path.
Figure 2B:
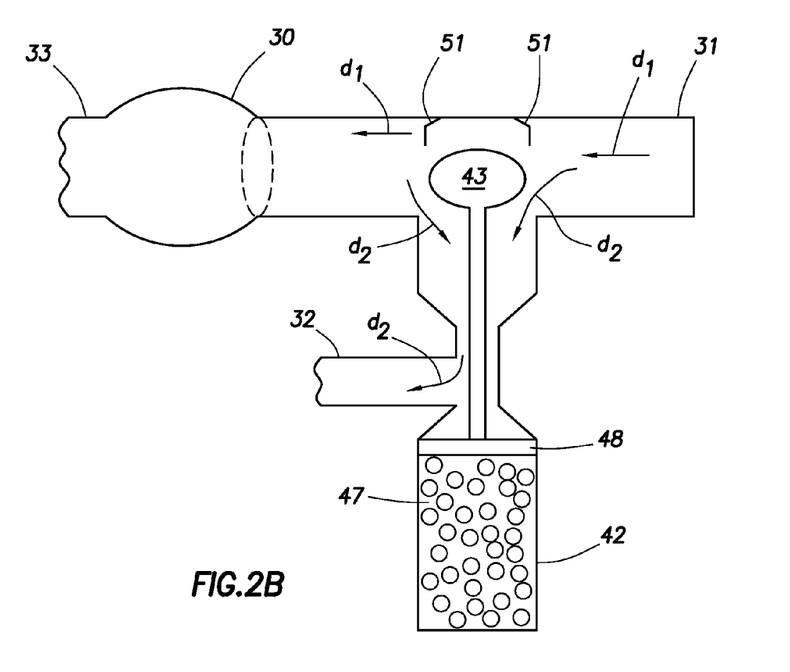

FIGS. 2A and 2B depict the use of a valve to open or close the fluid flow path. As can be seen in FIG. 2A, the valve can engage the lower seat 52 in a closed position, thus at least partially blocking flow into the second fluid flow path 32. Fluid can enter the first fluid flow path 31 in the direction of $d_1$. The fluid can enter the ICD 30. In the event it is desirable to close the first fluid flow path 31 into the ICD 30, the material 47 can expand. The expansion of the material 47 can cause movement of the inlet covering 43, for example, by causing the piston 48 to move the inlet covering 43. After the inlet covering 43 has moved into an open position, fluid can flow in the direction of $d_2$ and enter the second fluid flow path 32 via the fluid inlet 41 (shown in FIG. 2A). Some fluid can still travel in the direction of $d_1$ and enter the ICD 30. However, the system can be designed such that the inlet covering 43 travels a sufficient distance to engage with an upper seat 51, thus completely preventing fluid flow into the ICD 30 (not shown). As can be seen, the flexibility of the system allows for partial or complete prevention of fluid flow into an ICD. Additionally, the system can be designed such that movement of the inlet covering 43 is reversible. For example, in the event that it is desirable to open fluid flow into the ICD 30, the material 47 can contract via a change in temperature. The contraction of the material 47 can cause movement of the inlet covering 43 to open the path of fluid flow into the ICD 30 and/or close the second fluid flow path 32. Of course, this process of opening and closing a fluid flow path can be repeated as many times as desirable.

Figure 3A:
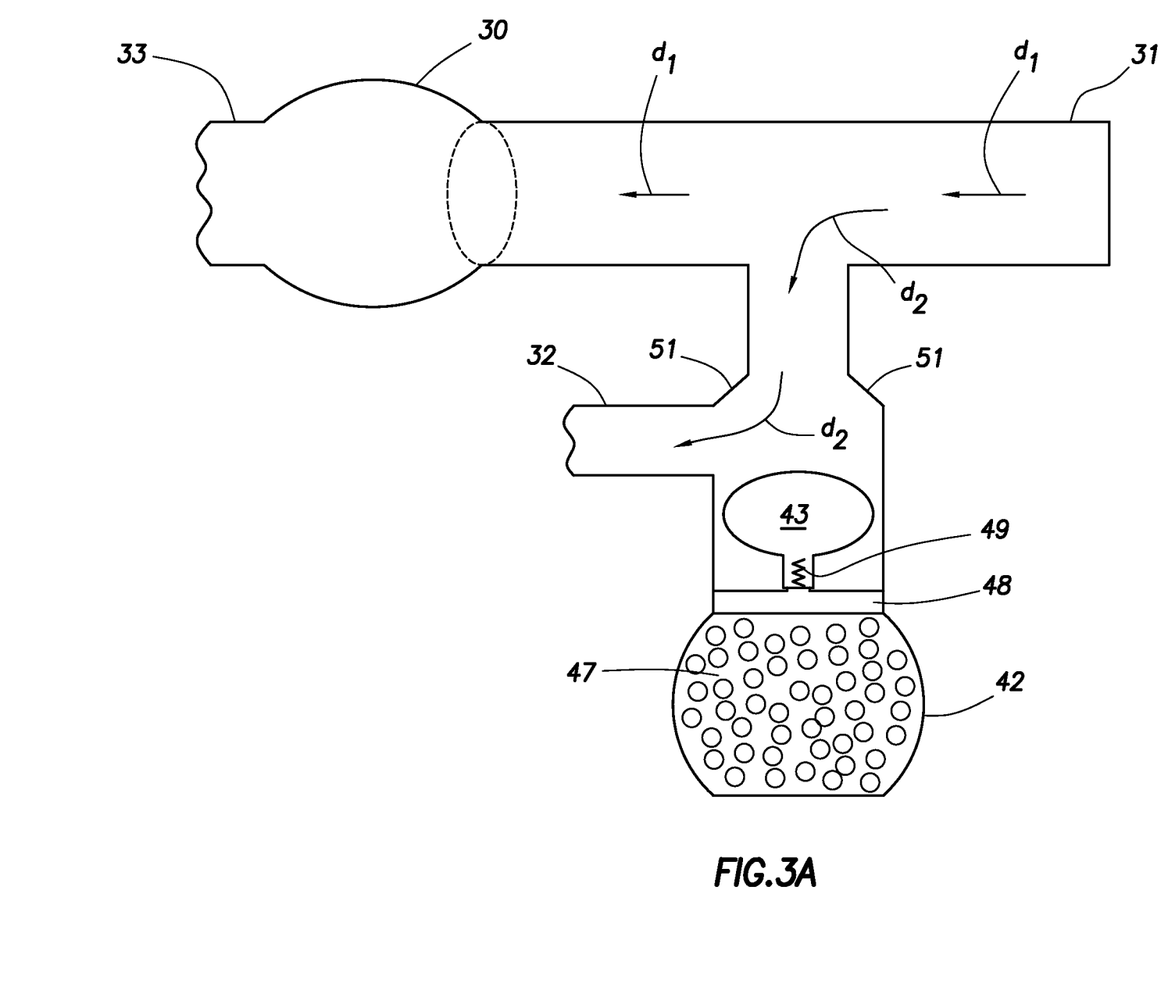
FIGS. 3A and 3B depict the device of FIGS. 2A and 2B wherein the expansion of the material closes the fluid flow path.
Figure 3B:
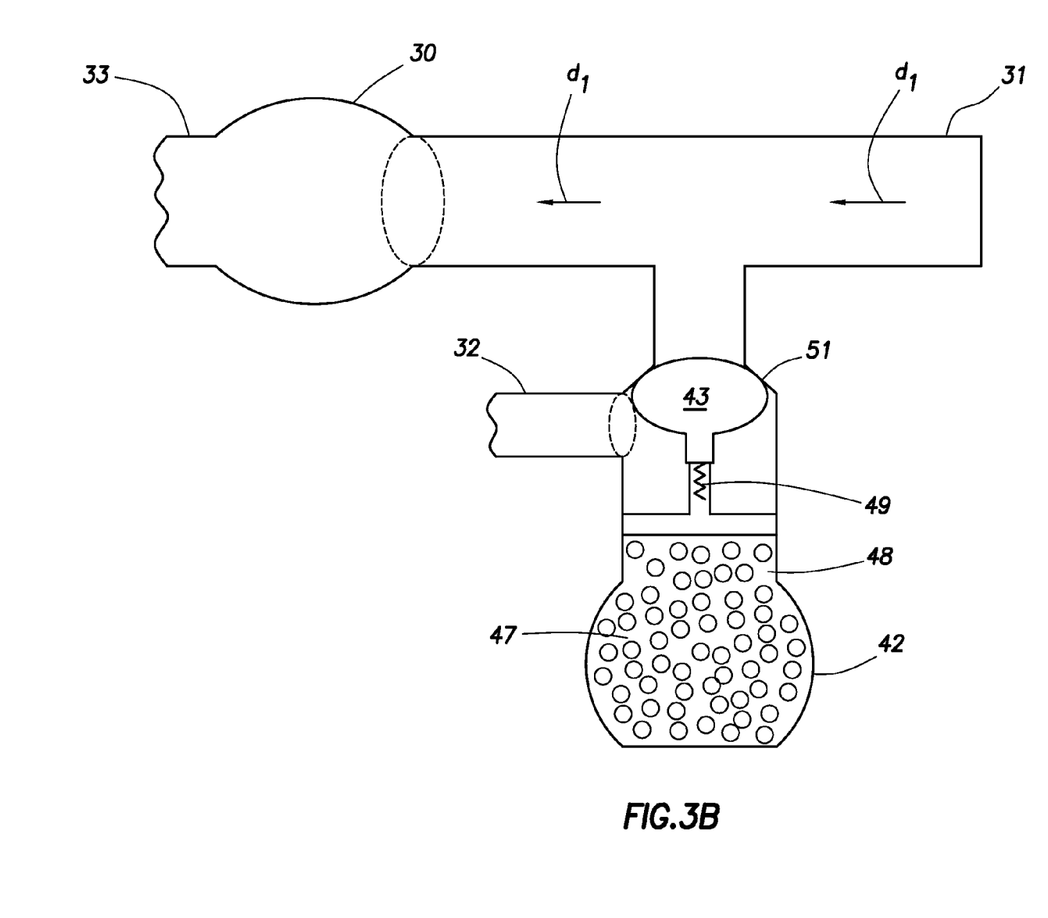

FIGS. 3A and 3B depict an example of closing a fluid flow path via an expansion of the material 47. As can be seen in FIG. 3A, the inlet covering 43 can be in an open position. Expansion of the material 47 can cause movement of the inlet covering 43 to close the second fluid flow path 32. The inlet covering 43 can engage with the upper seat 51 to close the second fluid flow path 32. The contraction of the material can cause movement of the inlet covering 43 to open the second fluid flow path 32.

Figure 4A:
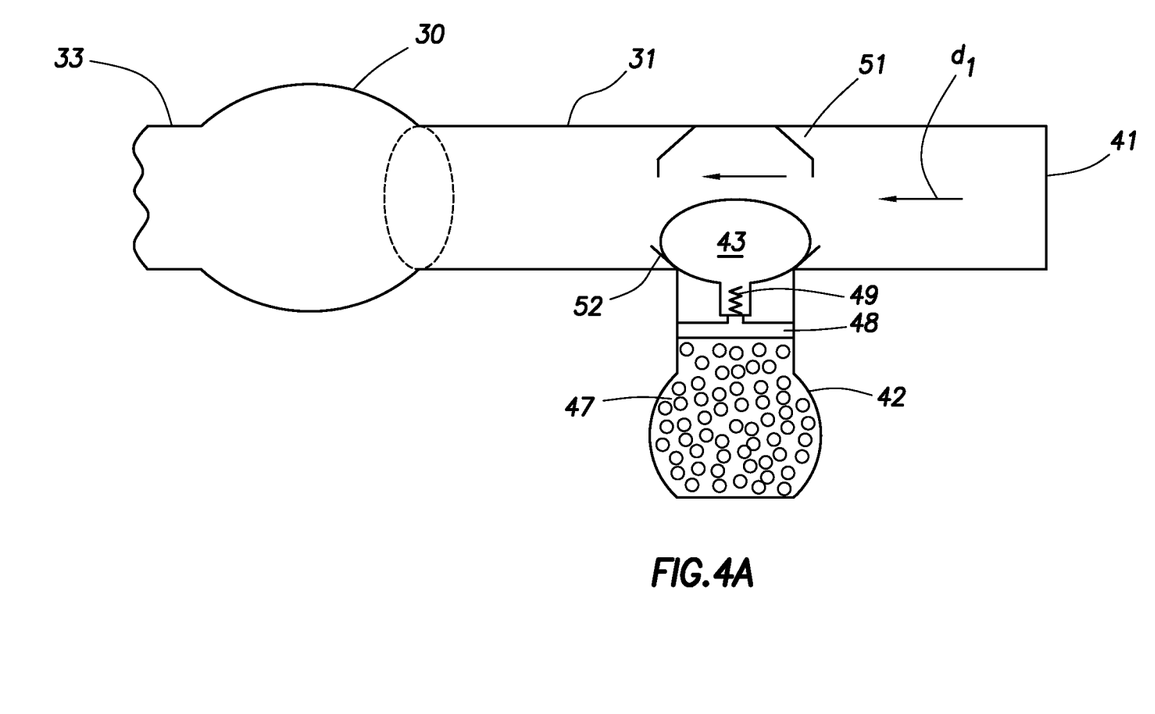
FIGS. 4A and 4B depict the device of FIGS. 3A and 3B according to another embodiment.
Figure 4B:
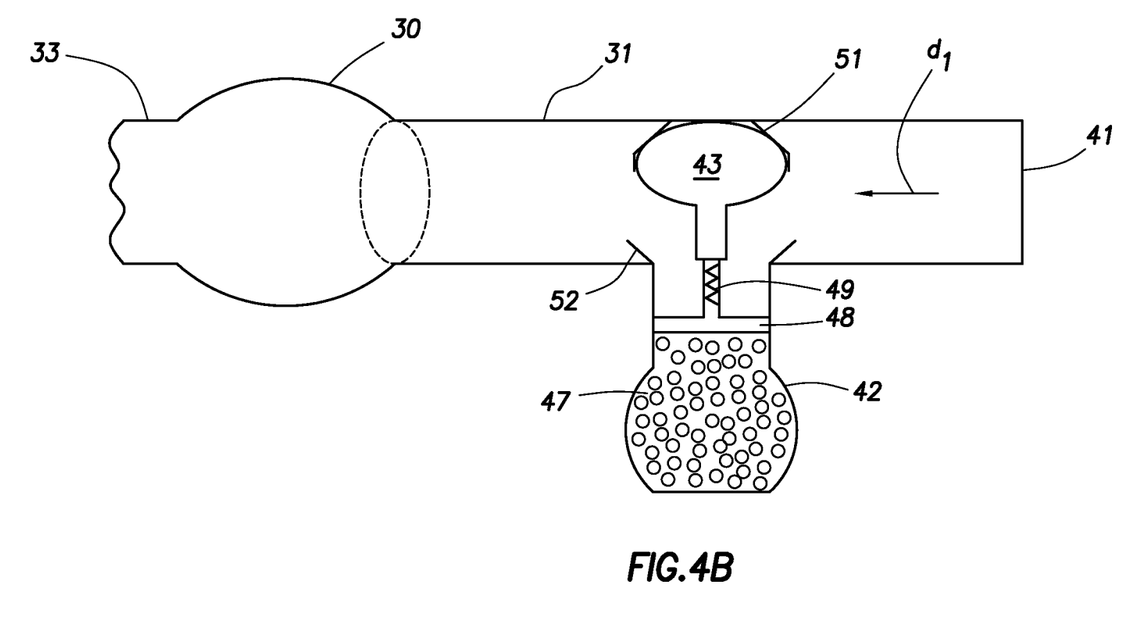

FIGS. 4A and 4B illustrate an example of the inlet covering 43 opening or closing the first fluid flow path 31. An ICD 30 can adjoin the first fluid flow path 31. In the event it is desirable to decrease the amount of fluid flowing into the ICD 30, then the inlet covering 43 can be moved into a closed position. This can be accomplished, for example, by an expansion of the material 47. The movement of the inlet covering 43 can be reversible, for example, by contraction of the material 47. This can be useful when it is desirable to close a fluid flow path into an ICD and then open the flow path into the ICD or vice versa. This embodiment may be useful when other flow paths exist in the system wherein a fluid can flow through these other flow paths.

Figure 5:
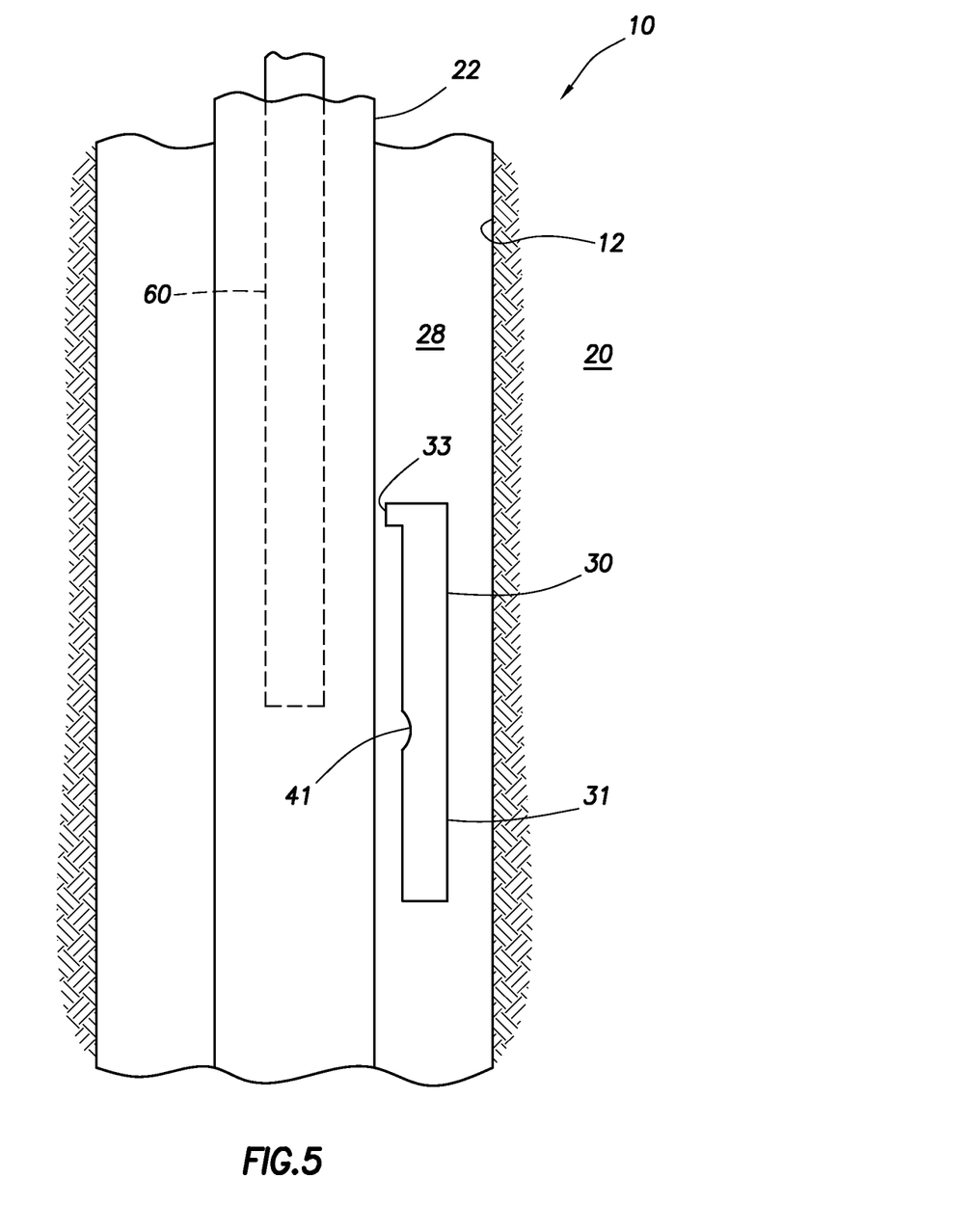
FIG. 5 is a diagram of a portion of a well system depicting the use of the device.

FIG. 5 depicts one example of a system in which the device can be used. The system depicted is a well system 10. The well system 10 can include a wellbore 12. The wellbore 12 can penetrate a subterranean formation 20. The subterranean formation 20 can be a portion of a reservoir or adjacent to a reservoir. The well system 10 can include a tubing string 22. An annulus 28 can exist between the wall of the wellbore 12 and the outside of the tubing string 22. Fluids can be introduced into the subterranean formation 20 via the tubing string 22 and fluids can also be removed from the subterranean formation 20 and/or the wellbore 12 via the wellbore 12 and/or annulus 28. The well system 10 can include the ICD 30 and the device. The outlets can be functionally oriented such that fluid can flow into the annulus 28 and/or the tubing string 22 via the first fluid outlet 33 and/or the second fluid outlet 34 (not shown). The outlets can also be functionally oriented such that fluid can flow into at least a portion of the subterranean formation 20.

The material 47 is capable of expanding or contracting via a change in temperature. The exact change in temperature can be determined based on several factors including, but not limited to: the bottomhole temperature and pressure of the wellbore 12; and the specific material 47 used, including the transition temperature of the material 47. As used herein, the term "bottomhole" refers to the portion of the well where the device is located. The system can include a tubing 60 for causing the change in temperature. The tubing 60 can be a coiled tubing. If the change in temperature is a decrease in temperature, then the tubing 60 can be used to introduce a substance that has a lower temperature than the bottomhole temperature of the wellbore 12. By way of example, a liquid can be introduced adjacent to the device via the tubing 60. The liquid can be a cold liquid such as water, a circulation fluid, an injection fluid, or nitrogen.

The decrease in temperature can also be achieved via a chiller (not shown). The chiller can be a mechanical device that is capable of cooling the device. The chiller can be positioned adjacent to the device in a manner such that the chiller is capable of causing the necessary temperature decrease to the material 47. In the event that it is desirable to cause the temperature change, then the chiller can be activated to lower the temperature of the material 47. The well system 10 can also include an insulating material. The insulation can help prevent heat loss of the material 47 into the surrounding environment.

If the change in temperature is an increase in temperature, then the tubing 60 can be used to introduce a substance that has a higher temperature than the bottomhole temperature of the wellbore 12. By way of example, a liquid can be introduced adjacent to the device via the tubing 60. The liquid can be a heated liquid such as water or a circulation fluid.

The increase in temperature can also be achieved by de-activating, or switching off, the chiller. In this manner, the temperature of the material 47 can increase to the bottomhole temperature. The increase in temperature can also be caused by allowing or causing an exothermic reaction to occur between two or more reactants. In an exothermic reaction, the total amount of energy required for the reaction to occur is less than the total amount of energy in the system. As a result, energy, in the form of heat and/or light, is released. Once started, an exothermic reaction will continue to release heat or light until at least one of the reactants is consumed, so long as no interference occurs. The amount of heat produced from the exothermic reaction can vary depending on the reactants selected and the amount of reactants used. As such, it is possible to control the amount of heat by selecting the proper reactants. The well system 10 can also include a conductor. The conductor can be used to help transfer heat to the material 47. Thermal conductors are known in the art.

Figure 6:
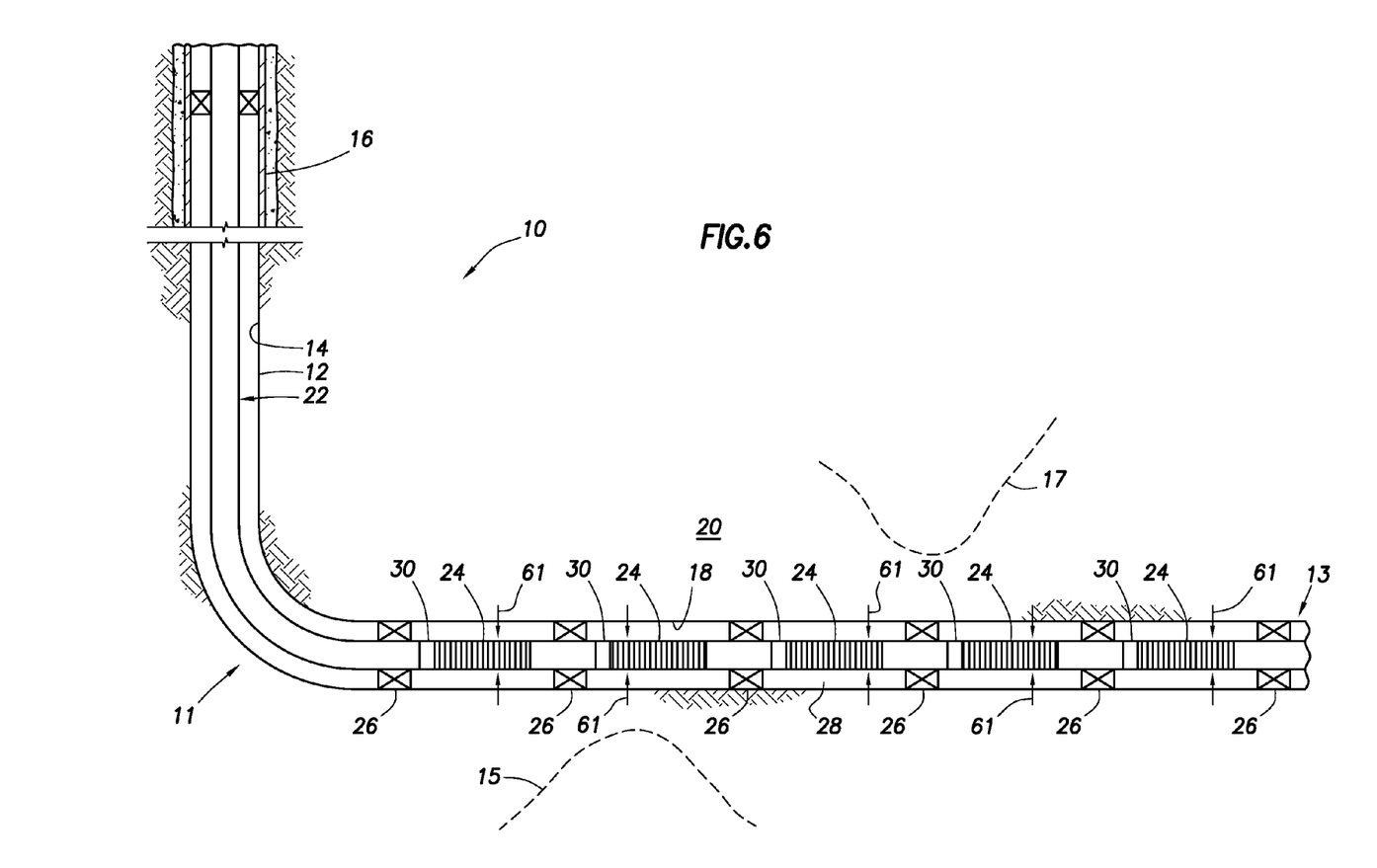
FIG. 6 is a diagram of the well system containing multiple devices.

FIG. 6 is the well system 10 which can encompass certain embodiments. As depicted in FIG. 6, the wellbore 12 has a generally vertical uncased section 14 extending downwardly from a casing 16, as well as a generally horizontal uncased section 18 extending through the subterranean formation 20.

The tubing string 22 (such as a production tubing string or base pipe) is installed in the wellbore 12. Interconnected in the tubing string 22 are multiple well screens 24, ICDs 30, and packers 26.

The packers 26 seal off the annulus 28 formed radially between the tubing string 22 and the wellbore section 18. In this manner, a fluid 61 may be produced from multiple zones of the formation 20 via isolated portions of the annulus 28 between adjacent pairs of the packers 26.

Positioned between each adjacent pair of the packers 26, a well screen 24 and an ICD 30 are interconnected in the tubing string 22. The well screen 24 filters the fluid 61 flowing into the tubing string 22 from the annulus 28. The ICD 30 regulates the flow rate of the fluid 61 into the tubing string 22. In another embodiment, the well system 10 is an injection well and the ICD 30 regulates the flow rate of fluid 61 flowing out of the tubing string 22 and into the formation 20.

It should be noted that the well system 10 is illustrated in the drawings and is described herein as merely one example of a wide variety of well systems in which the principles of this disclosure can be utilized. It should be clearly understood that the principles of this disclosure are not limited to any of the details of the well system 10, or components thereof, depicted in the drawings or described herein. Furthermore, the well system 10 can include other components not depicted in the drawing. For example, cement may be used instead of packers 26 to isolate different zones. Cement may also be used in addition to packers 26.

By way of another example, the wellbore 12 can include only a generally vertical wellbore section 14 or can include only a generally horizontal wellbore section 18. The fluid 61 can be produced from the formation 20, the fluid could also be injected into the formation, and the fluid could be both injected into and produced from the formation. The system can be used during any phase of the life of a well including, but not limited to, the drilling, evaluation, stimulation, injection, completion, production, and decommissioning of a well.

The well system does not need to include a packer 26. Also, it is not necessary for one well screen 24 and one ICD 30 to be positioned between each adjacent pair of packers 26. It is also not necessary for a single ICD 30 to be used in conjunction with a single well screen 24. Any number, arrangement and/or combination of these components may be used. Moreover, it is not necessary for any well screen 24 to be used in conjunction with an ICD 30. For example, in injection wells, the injected fluid could be flowed through an ICD 30, without also flowing through a well screen 24. There can be multiple ICDs 30 connected in fluid parallel or series. Furthermore, it is not necessary that every ICD 30 include the device. The specific ICDs 30 that include the device can be predetermined.

It is not necessary for the well screens 24, ICDs 30, packers 26 or any other components of the tubing string 22 to be positioned in uncased sections 14, 18 of the wellbore 12. Any section of the wellbore 12 may be cased or uncased, and any portion of the tubing string 22 may be positioned in an uncased or cased section of the wellbore.

The wellbore 12 can include a heel 11 and a toe 13. Pressure loses across the horizontal section 18 of the wellbore 12 can cause the flowing tubing pressure to be lower at the heel 11 than at the toe 13. This lower flowing tubing pressure can cause gas coning 17 or water coning 15. Being able to control the flowing tubing pressure in different zones is often used to prevent gas coning 17 or water coning 15. At least one ICD 30 can be placed in each zone. It is often desirable to produce oil or gas from the toe 13 first or to inject into the subterranean formation 20 at the toe 13 first. As such, it may be desirable to decrease or eliminate the amount of fluid flowing into a particular ICD 30 by using the device. The device can be used to close the first fluid flow path 31, as depicted in FIGS. 4A and 4B, or to open the second fluid flow path 32 (thus allowing the fluid to bypass the ICD 30), as depicted in FIGS. 1A-3B. The well system 10 can be designed such that the material 47 used for a first device has a different transition temperature (i.e., the temperature at which the material expands or contracts) compared to the material 47 used for a second device. There can also be several devices used in the system, wherein each device includes a material 47, each having a different transition temperature compared to the other materials. By way of example, the device located at or near the heel 11 can include a material 47 having a lower transition temperature compared to the material included in a device located at or near the toe 13. The difference in the transition temperature between the material 47 located at the heel 11 and the material located at the toe 13 can be pre-determined. There can also be multiple devices located in different zones positioned between the heel 11 and the toe 13. These multiple devices can contain a material 47, wherein the transition temperature is a gradient between the transition temperature at the heel 11 and the toe 13. For example, the material at the heel 11 may have the lowest transition temperature. The next zone (moving in the direction towards the toe 13) can contain a material 47 having a slightly higher transition temperature than the heel 11, but less than the toe 13, and so on wherein there is a range of transition temperatures moving from the low end at the heel 11 to a high end at the toe 13. Of course, the range of temperatures can be reversed wherein the heel 11 has the highest transition temperature and the toe 13 has the lowest transition temperature. Moreover, it is possible to create any pattern of transition temperatures depending on the specifics for a given oil or gas operation. For example, the middle portion of the horizontal wellbore 18 can include the highest transition temperatures whereas the heel 11 and the toe 13 contain the lowest transition temperatures.

The following are some examples, but not the only examples that could be given, of how a difference in transition temperatures of the material 47 can be used in the well system 10. At the end of the life of a production well, it may be desirable to produce as much oil or gas as possible. It may also be desirable to disable the ICDs 30 (i.e., decrease the amount of fluid flowing into the ICDs) starting at the toe 13 and then moving back towards the heel 11, whereby subsequent ICDs are disabled along the way. Referring to FIGS. 2A, 2B, 4A, and 4B, the devices located near the toe 13 can contain a material 47 that has a higher transition temperature compared to the heel 11. As the bottomhole temperature at the toe 13 is generally higher than the heel 11, the devices at the toe 13 will either close the flow path into the ICD or open a bypass flow path at the toe 13 first, while the devices at the heel 11 remain open to the ICD or closed to the bypass path. An increase in temperature can be caused along the horizontal wellbore 18, moving in a direction towards the heel 11 to continue to disable additional ICDs along the way. Referring to FIGS. 3A and 3B, the devices located near the toe 13 can contain a material 47 that has a lower transition temperature compared to the heel 11. As the bottomhole temperature at the toe 13 is generally higher than the heel 11, the material 47 included in the devices at the toe 13 will contract at the lower temperature and open the bypass flow path, while the devices at the heel 11 remain closed. An increase in temperature can be caused along the horizontal wellbore 18, moving in a direction towards the heel 11 to continue to open additional bypass flow paths.

For injection wells or during stimulation operations, it may be desirable to disable the ICDs 30 starting at the heel 11 and then move towards the toe 13, whereby subsequent ICDs are disabled along the way. Each zone of the wellbore 12 can include two devices. Each device can include a material 47 that has a different transition temperature compared to the other device. For example, a first material can have a higher transition temperature than a second material. The first zone can be located at or near the heel 11. As an injection fluid is introduced into the wellbore 12, the heel will generally cool down first. The first device containing the first material can be designed such that as the temperature decreases, an ICD located in the first zone is disabled (i.e., by closing the flow path into the ICD or opening a bypass flow path). The second device containing the second material (having a lower transition temperature than the first material) can be designed such that as the temperature decreases further within the first zone, fluid flow into the first zone is decreased or eliminated. The injection fluid can now continue to flow into a second zone that is located farther away from the heel 11. The process just described can be repeated along multiple zones of the wellbore 12 working from the heel 11 towards the toe 13. Moreover, if the introduction of the injection fluid is stopped, then the bottomhole temperature of the well can be used to create an increase in temperature to the material 47 such that zones become open and/or ICDs become enabled. A retainer 46, such as a J-slot, can be used to allow for a reciprocating action of the inlet covering 43 between closed and open positions during repeated temperature changes.

It will be appreciated by those skilled in the art that it would be beneficial to be able to provide improved zonal flowing tubing pressures via the use of devices in conjunction with ICDs. Other uses for the devices in a well include, but are not limited to, balancing production from (or injection into) multiple zones, minimizing production or injection of undesired fluids, maximizing production or injection of desired fluids, etc.

According to an embodiment, a method for opening or closing a fluid flow path comprises: allowing or causing a change in temperature to a material, a) wherein the material expands or contracts via the change in temperature, b) wherein the expansion or contraction of the material causes movement to an inlet covering, wherein the inlet covering is adjacent to a fluid inlet and wherein the fluid inlet comprises one end of a fluid flow path, and c) wherein the movement of the inlet covering either opens or closes the fluid flow path.

The methods include the step of allowing or causing a change in temperature to the material 47. The step of causing can include introducing a tubing 60 into a portion of the wellbore 12, wherein the portion of the wellbore is adjacent to the device. The step of causing can also include introducing a fluid into the portion of the wellbore via the tubing 60, wherein the fluid has a different temperature than the bottomhole temperature of the wellbore 12. For example, if it is desirable to cause a decrease in temperature of the material 47, then a cooled fluid, such as water, a treatment fluid, or liquid nitrogen can be introduced into the portion of the wellbore. The step of causing can include activating a chiller to lower the temperature of the material 47. By way of another example, if it is desirable to cause an increase in temperature of the material 47, then a heated fluid, such as water or a treatment fluid can be introduced into the portion of the wellbore. The step of causing can include allowing or causing an exothermic reaction to occur between two or more products to increase the temperature of the material 47. The step of allowing can include de-activating the chiller or allowing the bottomhole temperature to create the change in temperature.

The methods can further include the step of placing at least one device in a portion of the wellbore 12. The methods can include the additional steps of producing oil or gas, perforating, fracturing, performing an acidizing treatment, or performing enhanced recovery operations, wherein any of the aforementioned steps can be performed before, during, or after the step of allowing or causing a change in temperature to the material 47.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A device for opening or closing a fluid flow path comprising:
    a fluid inlet, wherein the fluid inlet comprises one end of the fluid flow path;
    an inlet covering, wherein the inlet covering is adjacent to the fluid inlet;
    a material, wherein the material is capable of expanding or contracting via a change in temperature;
    wherein the expansion or contraction of the material causes movement to the inlet covering, and wherein the movement of the inlet covering either opens or closes the fluid flow path;
    a chamber, wherein the chamber is adjacent to the inlet covering, wherein the material is placed in the chamber;
    an expansion restrictor configured to direct the expansion of the material in a desired direction;
    a shear pin located adjacent to the inlet covering, wherein the shear pin is configured to break when a predetermined amount of force is applied to the shear pin to enable the inlet covering to move; and
    a retainer located adjacent to the shear pin configured to prevent the inlet covering from moving back into a closed position after the movement of the inlet covering into the open position.

2. The device according to claim 1, wherein the fluid flow path comprises a fluid outlet.

3. The device according to claim 2, further comprising an autonomous inflow control device capable of controlling a flow of a fluid without any external intervention, wherein the movement of the inlet diverts the flow of fluid to or from the autonomous inflow control device.

4. The device according to claim 1, wherein the material is selected from the group consisting of liquid forms of:
    water, silicon, germanium, bismuth, antimony, gallium, and metal alloys containing any of the aforementioned metals;
    shape-memory metals; and
    shape-memory plastics.

5. The device according to claim 4, wherein the material is capable of expanding with a decrease in temperature and contracting with an increase in temperature.

6. The device according to claim 1, wherein the material is selected from the group consisting of:
    shape-memory alloys, shape-memory plastics, metals, plastics, compounds undergoing a phase change from a solid to a liquid or from a liquid to a gas, and compounds that are malleable near 71.degree. F. (21.7.degree. C.).

7. The device according to claim 6, wherein the material is capable of expanding with an increase in temperature and contracting with a decrease in temperature.

8. The device according to claim 7, wherein the material is a wax.

9. The device according to claim 1, wherein the material is selected such that a desired amount of expansion or contraction is achieved.

10. The device according to claim 1, wherein the inlet covering is moved a sufficient distance to open or close the fluid flow path.

11. The device according to claim 1, wherein the inlet covering is a plug, plate, or sleeve.

12. The device according to claim 1, wherein the inlet covering is part of a valve.

13. The device according to claim 12, further comprising a piston, wherein the valve is connected to the piston.

14. The device according to claim 13, wherein expansion of the material causes movement of the valve via the piston.

15. The device according to claim 1, wherein the material comprises a bimetallic strip.

* * * * *